United States Patent
Miyata

(10) Patent No.: US 10,288,505 B2
(45) Date of Patent: May 14, 2019

(54) LASHING TENSION VERIFICATION TOOL

(71) Applicant: BANDO CHEMICAL INDUSTRIES, LTD., Hyogo (JP)

(72) Inventor: Hirofumi Miyata, Hyogo (JP)

(73) Assignee: BANDO CHEMICAL INDUSTRIES, LTD., Hyogo (JP)

( * ) Notice: Subject to any disclaimer, the term of this patent is extended or adjusted under 35 U.S.C. 154(b) by 140 days.

(21) Appl. No.: 15/687,453

(22) Filed: Aug. 26, 2017

(65) Prior Publication Data

US 2017/0356819 A1    Dec. 14, 2017

Related U.S. Application Data

(63) Continuation of application No. PCT/JP2016/000590, filed on Feb. 5, 2016.

(30) Foreign Application Priority Data

Mar. 31, 2015   (JP) .................................. 2015-070797

(51) Int. Cl.
| | |
|---|---|
| *B60P 7/08* | (2006.01) |
| *G01L 5/04* | (2006.01) |
| *G01L 5/06* | (2006.01) |

(52) U.S. Cl.
CPC .............. *G01L 5/06* (2013.01); *B60P 7/0861* (2013.01); *G01L 5/04* (2013.01)

(58) Field of Classification Search
CPC ..................................... G01L 5/04; G01L 5/06
See application file for complete search history.

(56) References Cited

U.S. PATENT DOCUMENTS 3,296,857 A * 1/1967 Kaczeus ................... G01L 5/06
                                                            73/159
3,329,013 A * 7/1967 Beindorf ................... G01L 5/06
                                                            73/862.453

(Continued)

FOREIGN PATENT DOCUMENTS

| DE | 3138655 A1 * | 4/1983 | ............... G01L 5/06 |
| JP | S63-159740 U | 10/1988 | |

(Continued)

OTHER PUBLICATIONS

International Search Report and WO dated Mar. 15, 2016 in application No. PCT/JP2016/000590.

*Primary Examiner* — David A Rogers
(74) *Attorney, Agent, or Firm* — Maschoff Brennan

(57) ABSTRACT

A pair of insertion portions each having a through hole through which a lashing belt is inserted and extends are arranged at a predetermined distance from each other, and coupled to each other with coupling portions. A tension detecting portion is provided at the coupling portions. The tension detecting portion extends, at a predetermined vertical distance from a line connecting the through holes of the pair of insertion portions to each other, in a width direction of the lashing belt. In a state where the lashing belt is inserted to extend through the pair of insertion portions, a surface of the lashing belt is brought into contact with the tension detecting portion, and the tension detecting portion is configured to be broken when a predetermined or greater tension is applied to the lashing belt.

4 Claims, 2 Drawing Sheets

(56) References Cited

U.S. PATENT DOCUMENTS

| | | | | | |
|---|---|---|---|---|---|
| 3,832,899 | A | * | 9/1974 | Nicolau | G01L 5/08 73/862.194 |
| 3,879,999 | A | * | 4/1975 | Saxl | G01L 5/06 73/430 |
| 3,994,162 | A | * | 11/1976 | Auckland | B65H 59/40 73/862.46 |
| 4,135,393 | A | * | 1/1979 | Jordan | G01L 5/06 73/862.46 |
| 4,506,555 | A | * | 3/1985 | McCubbin | G01L 5/06 73/862.46 |
| 4,992,778 | A | * | 2/1991 | McKeen | B66C 15/00 116/212 |
| 5,026,230 | A | * | 6/1991 | Dolezych | B60P 7/0861 267/71 |
| 5,400,868 | A | * | 3/1995 | Ellis | A63C 11/00 182/18 |
| 5,738,259 | A | * | 4/1998 | Allen | B60R 9/06 224/493 |
| 5,845,370 | A | * | 12/1998 | Cohoon | B60P 7/0823 24/68 CD |
| 5,965,827 | A | * | 10/1999 | Stanley | G01L 5/10 73/862.391 |
| 6,041,666 | A | * | 3/2000 | MacKarvich | G01L 5/06 73/828 |
| 6,357,978 | B1 | * | 3/2002 | Kamper | B60P 7/0823 410/100 |
| 6,520,032 | B2 | * | 2/2003 | Resh | B60R 21/013 73/831 |
| 6,851,715 | B2 | * | 2/2005 | Devereaux | B60R 22/18 280/806 |
| 6,959,779 | B2 | * | 11/2005 | Curtis | B60R 22/00 180/268 |
| 7,100,944 | B2 | * | 9/2006 | Stanley | B60R 22/18 280/801.1 |
| 7,234,729 | B2 | * | 6/2007 | Curtis | B60R 21/33 280/735 |
| 7,242,286 | B2 | * | 7/2007 | Knox | B60R 22/48 340/457.1 |
| 8,506,220 | B2 | * | 8/2013 | Morland | B60P 7/0861 340/440 |
| 8,635,918 | B2 | * | 1/2014 | Lanter | B60R 22/105 73/862.391 |
| 2001/0035122 | A1 | * | 11/2001 | Margetts | G01L 5/047 116/283 |
| 2008/0193248 | A1 | * | 8/2008 | Lindblad | B60P 7/0823 410/100 |
| 2008/0251002 | A1 | * | 10/2008 | Burleigh | B60N 2/2809 116/212 |
| 2008/0312682 | A1 | * | 12/2008 | Shams | A61B 17/1327 606/203 |
| 2009/0044383 | A1 | * | 2/2009 | Gastaldi | A44B 11/2557 24/171 |
| 2012/0060629 | A1 | * | 3/2012 | Lanter | B60R 22/105 73/862.453 |
| 2017/0322097 | A1 | * | 11/2017 | Horn | G01L 5/10 |

FOREIGN PATENT DOCUMENTS

| | | | | |
|---|---|---|---|---|
| JP | 2001-180441 | A | | 7/2001 |
| JP | 2007-537435 | A | | 12/2007 |
| JP | 2012-112152 | A | | 6/2012 |
| WO | WO-9302343 | A1 | * | 2/1993 ............ G01L 5/06 |
| WO | WO-2011129761 | A1 | * | 10/2011 ............ G01L 5/06 |

* cited by examiner

LASHING TENSION VERIFICATION TOOL

CROSS-REFERENCE TO RELATED APPLICATIONS

This is a continuation of International Application No. PCT/JP2016/000590 filed on Feb. 5, 2016, which claims priority to Japanese Patent Application No. 2015-070797 filed on Mar. 31, 2015. The entire disclosures of these applications are incorporated by reference herein.

BACKGROUND

The present invention relates to a lashing tension verification tool which is used to verify a tension applied to a lashing band member.

Lashing tension verification tools have been known and used to verify whether a lashing band member with which a cargo is lashed down is under a predetermined or greater tension.

For example, Japanese Unexamined Patent Publication (Japanese Translation of PCT Application) No. 2007-537435 discloses a tension indicator for indicating a tension applied to a strap of a child safety seat. In this tension indicator, when a strap is under a tension, the tension causes a pivotable member to pivot against urging force of a spring member, and an abutment and a passage become positioned in alignment. In response to the alignment, the tension indicator indicates that the strap is under the tension.

Japanese Unexamined Patent Publication No. 2001-180441 discloses a belt tension detector including a belt bending mechanism which bends a belt being under a tension, and is deformable according to the tension applied to the belt, and a sensor which senses deformation in the belt bending mechanism. The belt bending mechanism has a flexible structure, and unbends the belt when the tension applied to the belt exceeds a predetermined limit.

SUMMARY

However, the known lashing tension verification tools disclosed in Japanese Unexamined Patent Publication (Japanese Translation of PCT Application) No. 2007-537435 and Japanese Unexamined Patent Publication No. 2001-180441 have structures which are not simple enough. Further, taking account of costs for their materials and maintenance, it is impractical to provide the known verification tools at all of locations where tensions need to be measured.

In particular, when multiple cargos are fastened, each of the cargos needs to be provided with one lashing tension verification tool. It is therefore required that a lashing tension verification tool have as simple a structure as possible.

In view of the foregoing, it is therefore an object of the present invention to provide a lashing tension verification tool having a simple structure and enabling a user to easily verify whether a lashing band member with which a cargo is lashed down is under a predetermined or greater tension.

To achieve the above object, the lashing tension verification tool of the present invention has a portion which is configured to be broken when a predetermined or greater tension is applied.

Specifically, the present invention is implemented as a lashing tension verification tool for verifying a tension applied to a lashing band member.

The lashing tension verification tool includes:

a pair of insertion portions arranged at a predetermined distance from each other, and each having a through hole through which the lashing band member is inserted and extends;

coupling portions coupling the pair of insertion portions to each other; and a tension detecting portion provided at the coupling portions and extending, at a predetermined vertical distance from a line connecting the through holes of the pair of insertion portions to each other, in a width direction of the lashing band member.

In a state where the lashing band member is inserted to extend through the pair of insertion portions, a surface of the lashing band member is in contact with the tension detecting portion, and the tension detecting portion is configured to be broken when a predetermined or greater tension is applied to the lashing band member.

In this configuration, when the lashing band member is inserted to extend through the through holes of the pair of insertion portions, one of the surfaces of the lashing band member which define the thickness of the lashing band member is brought into contact with the tension detecting portion provided between the pair of insertion portions. When a tension increasingly applied to the lashing band member becomes equal to or greater than a predetermined tension, the tension detecting portion is broken. This breakage of the tension detecting portion due to the tension equal to or greater than the predetermined or greater tension allows a user to verify that the predetermined or greater tension has been applied to the lashing band member. The lashing tension verification tool remains attached on the lashing band member even after the breakage of the tension detecting portion. The fact that the lashing tension verification tool with its tension detecting portion broken remains attached on the lashing band member indicates to the user that the lashing band member with which an associated cargo is lashed down is under the predetermined or greater tension.

The tension detecting portion may be provided with a weak portion such that the tension detecting portion is broken due to the predetermined or greater tension. According to this configuration, the tension under which the breakage occurs may be adjusted easily by forming the weak portion in an appropriate manner.

The lashing tension verification tool may be made of a single integral molding of a resin material. The lashing tension verification tool with this configuration is light in weight and inexpensive.

The insertion portions and the coupling portions may be made of a resin molding, and at least a breakable portion of the tension detecting portion may be made of a metal member. With this configuration, since the breakable portion is made of a metal member, the breaking strength may be adjusted more easily than in the case where a resin molding is employed.

As can be seen from the foregoing, according to the present invention, in a state where the lashing band member is inserted to extend through the pair of insertion portions, a surface of the lashing band member is brought into contact with the tension detecting portion, and the tension detecting portion is configured to be broken when a predetermined or greater tension is applied to the lashing band member. Thus, the lashing tension verification tool of the present invention has a simple structure and allows a user to easily verify whether the lashing band member with which an associated cargo is lashed down is under the predetermined or greater tension.

DETAILED DESCRIPTION

Embodiments of the present invention will now be described with reference to the drawings.

Figure 1:
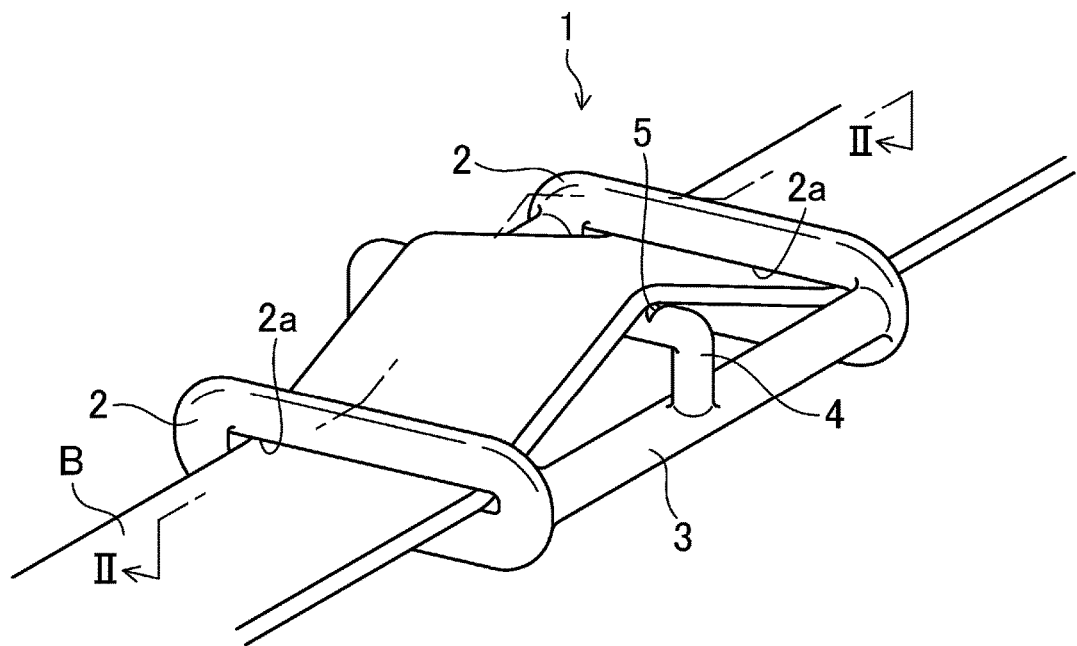
FIG. 1 is a perspective view illustrating a lashing tension verification tool with a lashing belt inserted therein.

FIG. 1 illustrates a lashing tension verification tool 1 according to an embodiment of the present invention. The lashing tension verification tool 1 is used, for example, to verify a tension when a cargo is lashed down to a deck of a ship or any other place by using a lashing band member configured as a lashing belt B. The lashing belt B is not limited to any particular type, and may be a fabric belt made from polyester or a rubber belt in which a cord is embedded. For example, a tension applied to the lashing belt B ranges from 2 kN to 20 kN. The lashing belt B has a width of 20 mm-50 mm, and a thickness of 2 mm-3 mm.

Figure 2:
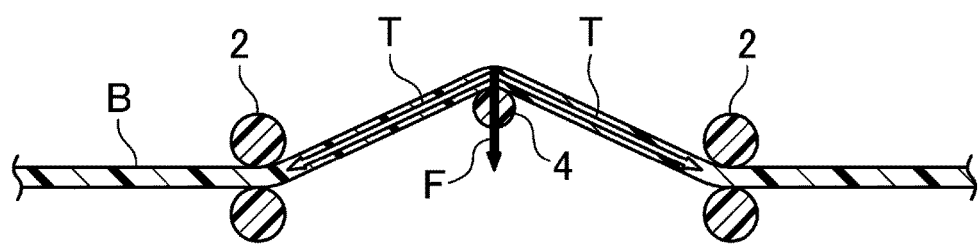
FIG. 2 is a cross-sectional view taken along the line II-II in FIG. 1.

For example, the lashing tension verification tool 1 is made of a resin molding, and includes a pair of insertion portions 2 which are arranged at a predetermined distance from each other. The insertion portions 2 each have a through hole 2a which has, for example, the shape of an ellipse and through which the lashing belt B is inserted and extends. Each through hole 2a suitably has a thickness and a width which allow the lashing belt B to extend therethrough. For example, each through hole 2a suitably has a thickness of 5 mm and a width of 60 mm. As illustrated in FIG. 2, the insertion portion 2 has, as non-limiting example, a circular cross section.

A pair of coupling portions 3 each having the shape of a rod couple the insertion portions 2 to each other in a length direction of lashing belt B. The coupling portion 3 may have any shape and any cross section. In this embodiment, each coupling portions 3 has a circular cross section.

A tension detecting portion 4 (see FIG. 3) is integrally provided at central locations, in the belt length direction, of the coupling portions 3. Specifically, the tension detecting portion 4 extends, at a predetermined vertical distance from a line connecting the through holes 2a of the pair of insertion portions 2 to each other, in a width direction of the lashing belt B.

In this embodiment, the tension detecting portion 4 has, for example, a gate shape when viewed in the belt length direction of the lashing belt B, and a circular cross section, so that the tension detecting portion 4 has a height which bends the lashing belt B to a certain extent. The tension detecting portion 4 is integral with the coupling portions 3. The tension detecting portion 4 has weak portions 5 such that the tension detecting portion 4 is broken due to the application of a predetermined or greater tension to the lashing belt B. For example, the weak portions 5 are implemented as notches, and spaced apart from each other in the width direction of the lashing belt B. The weak portions 5 may be implemented as through holes, for example.

It is now described how to use the lashing tension verification tool 1 having the configuration described above.

First, as illustrated in FIG. 1, the lashing belt B is inserted and allowed to extend through the pair of insertion portions 2. At this time, the back surface (or the front surface) of the lashing belt B is brought into contact with the tension detecting portion 4.

Next, as the cross section in FIG. 2 illustrates, the lashing belt B is gradually tightened using a cargo lashing device (not shown) attached to the lashing belt B. As a belt tension T increases, a component of force F acting on the tension detecting portion 4 increases gradually. At this time, the lashing operation is facilitated by placing the lashing tension verification tool 1 directly above the cargo lashing device.

When the belt tension T applied by the cargo lashing device to the lashing belt B becomes equal to or greater than a predetermined tension, the tension detecting portion 4 is broken, at the weak portions 5, due to the component of force F. The predetermined tension is determined according to the size and weight of a cargo to be lashed down, and a load applied during the transport.

Thus, the breakage of the tension detecting portion 4 due to the predetermined or greater tension allows a user to verify that the predetermined or greater tension has been applied to the lashing belt B. The lashing tension verification tool 1 remains attached on the lashing belt B even after the breakage of the tension detecting portion 4. The fact that the lashing tension verification tool 1 with its tension detecting portion 4 broken remains attached on the lashing belt B indicates to the user that the lashing belt B with which the associated cargo is lashed down is under the predetermined or greater tension.

The tension under which the breakage occurs may be adjusted easily by positioning the weak portions 5 at appropriate locations in an appropriate manner.

Further, the lashing tension verification tool 1, which is made of a single integral molding of a resin material, is small in weight and inexpensive. Since the lashing tension verification tool 1 is inexpensive, a user can keep two or more types of the lashing tension verification tools 1 on hand for verifying two or more predetermined tensions. In order to make it easy to selectively use the two or more types of the lashing tension verification tools 1, the lashing tension verification tools 1 are beneficially marked with different colors or indications which represent the respective predetermined tensions to be verified.

As can be seen, the lashing tension verification tool 1 of this embodiment has a simple structure and enables a user to easily verify whether a lashing belt B with which an associated cargo is lashed down is under a predetermined or greater tension.

—Variation—

Figure 3:
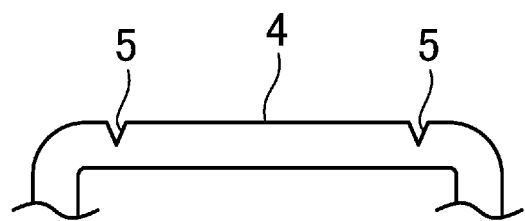
FIG. 3 is a front view illustrating, on an enlarged scale, a tension detecting portion.
Figure 4:
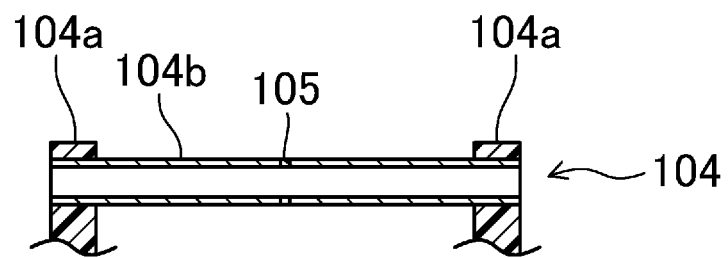
FIG. 4 is a cross-sectional view illustrating, on an enlarged scale, a tension detecting portion according to a variation.

FIG. 4 illustrates a variation of the embodiment of the present invention. This variation includes a tension detecting portion 104 which has a different configuration from that of the embodiment described above. Note that components that are the same as those shown in FIGS. 1-3 are denoted by the corresponding reference characters, and a detailed description thereof is omitted herein.

In this variation, the insertion portions 2 and the coupling portions 3 are made of a resin molding, and a tension detecting portion 104 has vertical portions 104a which are also made of the resin molding integrally with the coupling portions 3.

On the other hand, a breakable portion 104b which connects the pair of vertical portions 104a to each other is made of a metal member having, for example, the form of a circular pipe. For example, the metal member is a circular pipe made from a light metal such as an aluminum alloy. In this variation, the tension detecting portion 104 has, at its central location in the longitudinal direction of the tension detecting portion 104, a weak portion 105 configured as a through hole. The weak portion 105 may be configured as a slit, and may be provided at two or more locations.

With this configuration, since the breakable portion 104*b* of the tension detecting portion 104 is made of a metal member which is finished with high accuracy, the breaking strength may be adjusted more easily than in the case where a resin molding is employed.

Other Embodiments

The above embodiment of the present invention may be configured as follows.

The embodiment described above includes the weak portions 5 or 105. However, instead of providing the weak portions 5 or 105, the strength of the entire tension detecting portion 4 or 104 may be reduced such that the tension detecting portion is configured to be broken due to a predetermined or greater tension.

In the embodiment described above, the both ends of the tension detecting portion 4 are supported. However, the tension detecting portion 4 or 104 may be supported only at its one end in a cantilever manner.

The foregoing embodiments are merely preferred examples in nature, and are not intended to limit the scope, application, or uses of the present invention.

What is claimed is:

1. A lashing tension verification tool for verifying a tension applied to a lashing band member, the lashing tension verification tool comprising:

a pair of insertion portions arranged at a predetermined distance from each other, and each having a through hole through which the lashing band member is inserted and extends;

coupling portions coupling the pair of insertion portions to each other; and a tension detecting portion provided at the coupling portions and extending, at a predetermined vertical distance from a line connecting the through holes of the pair of insertion portions to each other, in a width direction of the lashing band member, wherein in a state where the lashing band member is inserted to extend through the pair of insertion portions, a surface of the lashing band member is in direct contact with the tension detecting portion, and the tension detecting portion is configured to be broken when a predetermined or greater tension is applied to the lashing band member.

2. The lashing tension verification tool of claim 1, wherein the tension detecting portion has a weak portion such that the tension detecting portion is broken due to application of the predetermined or greater tension.

3. The lashing tension verification tool of claim 1, wherein the pair of insertion portions, the coupling portions, and the tension detecting portion are all made of a single integral molding of a resin material.

4. The lashing tension verification tool of claim 1, wherein the insertion portions and the coupling portions are made of a single integral resin molding, and at least a breakable portion of the tension detecting portion is made of a metal member.

\* \* \* \* \*